(12) United States Patent
Gallagher (10) Patent No.: US 11,035,772 B2
(45) Date of Patent: Jun. 15, 2021

(54) MEASUREMENT OF FLUID PROPERTIES

(71) Applicant: Hydramotion Limited, Yorkshire (GB)

(72) Inventor: John Gallagher, Yorkshire (GB)

(73) Assignee: HYDRAMOTION LIMITED, Yorkshire (GB)

(*) Notice: Subject to any disclaimer, the term of this patent is extended or adjusted under 35 U.S.C. 154(b) by 347 days.

(21) Appl. No.: 15/771,626

(22) PCT Filed: Aug. 25, 2016

(86) PCT No.: PCT/GB2016/052654
§ 371 (c)(1),
(2) Date: Apr. 27, 2018

(87) PCT Pub. No.: WO2017/072477
PCT Pub. Date: May 4, 2017

(65) Prior Publication Data
US 2018/0313735 A1 Nov. 1, 2018

(30) Foreign Application Priority Data

Oct. 27, 2015 (GB) .................................. 1518986

(51) Int. Cl.
*G01N 11/16* (2006.01)
*G01N 11/00* (2006.01)
(52) U.S. Cl.
CPC .... *G01N 11/162* (2013.01); *G01N 2011/0033* (2013.01)
(58) Field of Classification Search
None
See application file for complete search history.

(56) References Cited

U.S. PATENT DOCUMENTS

| 5,323,638 A * | 6/1994 | Langdon ................. G01N 9/002 73/32 A |
| 6,450,013 B1 | 9/2002 | Gallagher |
| 2003/0056574 A1 | 3/2003 | Drahm et al. |
| 2005/0126268 A1 | 6/2005 | Ouriev et al. |
| 2013/0192349 A1 | 8/2013 | Ramkumar et al. |

(Continued)

FOREIGN PATENT DOCUMENTS

| WO | 2014209963 A1 | 12/2014 |
| WO | 2015168689 A1 | 11/2015 |

OTHER PUBLICATIONS

Deshpande et al. ("Vibrational Flow of Non-Newtonian Fluids", Chemical Engineering Science 56 (2001), p. 3845-3853). (Year: 2001).*

(Continued)

*Primary Examiner* — Roy Y Yi
(74) *Attorney, Agent, or Firm* — Fredrikson & Byron, P.A.

(57) ABSTRACT

Apparatuses and methods are disclosed for the analysing of non-Newtonian fluids and determining parameters to characterise the relationship between shear stresses and shear rates, i.e. the parameters of one or more rheological models of viscosity. A plurality of viscosity measurements are made in a fluid using one or more vibratory transducers operating at a plurality of frequencies. Parameters for the fluid are determined based on the measured viscosity values and the frequencies of vibration at which the viscosity measurements were obtained.

20 Claims, 3 Drawing Sheets

(56) References Cited

U.S. PATENT DOCUMENTS

2013/0205875 A1    8/2013  Lal et al.
2013/0276518 A1   10/2013  Dagalakis et al.
2014/0213744 A1    7/2014  Hlavinka et al.

OTHER PUBLICATIONS

Berta, M. et al., "Effect of viscoelasticity on foam development in zein-starch d," LWT-Food Science and Technology, vol. 63, No. 2, Oct. 1, 2015, pp. 1229-1235.

Lian, Z. et al., "A biomechanical model for real-time simulation of PMMA injection with haptics," Computers in Biology and Medicine, vol. 38, No. 3, 2008-20-20, pp. 304-312.

Chengliang, P. et al., "Torsional piezoelectric fiber for viscosity measurement of Newtonian fluids," Mechatronics and Automation (ICMA), 2012 International Conference ON, IEEE, Aug. 5, 2012, pp. 635-640.

Cox, W.P. et al., "Correlation of dynamic and steady flow viscosities," Journal of Polymer Science, Polymer Sympoais., vol. 28, No. 118, Apr. 1, 1958, pp. 619-622.

PCT Search Report and Written Opinion dated Nov. 8, 2016 for Intl. App. No. PCT/GB2016/052654, from which the instant application is based, 12 pgs.

\* cited by examiner

MEASUREMENT OF FLUID PROPERTIES

RELATED APPLICATIONS

This application is a 35 U.S.C. 371 national stage filing from International Application No. PCT/GB2016/052654, filed Aug. 25, 2016, which claims priority to British Application No. 1518986.3, filed Oct. 27, 2015, the teachings of which are incorporated herein by reference.

BACKGROUND

The present disclosure relates to techniques for the measurement of fluid properties, and is concerned particularly with measuring certain properties of non-Newtonian fluids for estimating fluid-dependent model parameters.

In a Newtonian fluid, the shear stress is directly proportional to the shear rate, the constant of proportionality being the viscosity of the fluid. Therefore the viscosity as a single parameter can be used to model or define the relationship between shear stress and shear rate of the fluid, and therefore the flow behaviour of Newtonian fluids. Water is an example of a Newtonian fluid.

In a non-Newtonian fluid, the relationship between shear stress and shear rate is not so simple. The apparent viscosity of the fluid is found to vary with, for example, the shear stress or the shear rate. Fluids that exhibit non-Newtonian behaviour include tomato ketchup, mayonnaise and paint. The study of the flow of these types of fluids is the field of 'rheology'.

Rheological models have been generated for non-Newtonian fluids, for which a small number of parameters can be obtained for a fluid, which may be used to determine the relationship between shear stress and shear rate in the fluid over a range of shear stresses or shear rates, or in other words the 'apparent' viscosity provided by the fluid under those particular conditions.

In the prior art, such parameters of rheological models are typically determined using a device that exerts shear forces in a fluid sample using a rotating or oscillating element. Complex viscoelastic parameters are usually determined by analysing the relationship between the shear rate and the developed shear stress. However, the devices use sensitive moving parts and their performance, and therefore the accuracy of measurement, can become affected by the environmental conditions in which they are used. Furthermore, the need to manage the fluid sample within a carefully defined volume, in order to calculate the shear rate accurately, generally makes these types of apparatus suitable only for the laboratory environment.

It would be desirable to provide an approach to determining fluid-dependent parameters of a rheological model that does not have the disadvantages of such existing approaches, and in particular, an approach that is not only suitable for laboratory use but can also be used 'on-line' or 'in-line', i.e. in a flowing line of a fluid process. It would further be desirable to provide an approach where such apparatus is suitable for use in aggressive process environments, including at high temperatures and pressures.

SUMMARY

Aspects of the invention relate to the analysing of a fluid through measuring viscosity using viscosity-measuring transducers under varying conditions and determining fluid-dependent parameters of a rheological model of viscosity, or viscosity model, to model the viscosity properties of the particular fluid under analysis.

A number of viscosity models have been established relating via equations the variation of shear stress or (apparent) viscosity with shear rate and other fluid properties. Some example models include the Bingham Model, the Casson Model, and the Herschel-Bulkley model, but the skilled reader will be aware that other models of the flow properties of non-Newtonian fluids exist. The present disclosure is not limited to the particular models described here; rather, any suitable model may be used depending, inter alia, on the fluid being measured. For example, depending on whether or not a fluid has a shear thinning or shear thickening behaviour, or whether the fluid is a yield stress fluid, certain models may be more suitable in characterizing the relationship between shear stress and shear rate in the fluid. In addition, certain models may be used with particular fluids as a result of industry traditions, such as the use of the Casson model in inks and molten chocolate.

The models of flow properties of non-Newtonian fluids can be used with appropriate measurements of physical quantities to determine fluid-dependent parameters of the models. An example fluid-dependent parameter which may be estimated according to the techniques of the present disclosure, is the yield stress $\sigma_0$, which is fluid property of technical and commercial importance in industry.

According to a first aspect of the invention, there is provided a method for analysing a fluid, the method comprising: obtaining a plurality of viscosity measurements at plural frequencies of vibration, the viscosity measurements being made using at least one vibratory transducer; and, based on the viscosity measurements and frequencies of vibration, determining the value of one or more parameters of a model for the fluid. The method may comprise obtaining a first viscosity measurement corresponding to a first frequency of vibration and a second viscosity measurement corresponding to a second frequency of vibration, and optionally third and subsequent viscosity measurements corresponding to respective third and subsequent frequencies of vibration.

According to a further aspect of the invention, there is provided an apparatus for analysing a fluid, the apparatus comprising: means for obtaining a plurality of viscosity measurements at plural frequencies of vibration, the viscosity measurements being made using at least one vibratory transducer; and means for, based on the viscosity measurements and frequencies of vibration, determining the value of one or more parameters of a model for the fluid by approximating at a shear rate quantity in the model by a frequency of vibration.

According to a further aspect of the invention, there is provided an apparatus for analysing a fluid, the apparatus comprising: input means for receiving a plurality of viscosity measurements made by one or more vibratory transducers, each of the plurality of viscosity measurements being made at a different frequency of vibration; and parameter-estimating means for, based on the viscosity measurements and frequencies of vibration, determining the value of one or more parameters of a model for the fluid.

According to a further aspect of the invention, there is provided an apparatus for analysing a fluid, the apparatus comprising: one or more vibratory transducers for making a plurality of viscosity measurements, each of the plurality of viscosity measurements being made at a different frequency of vibration; and an electronic parameter estimator for, based on the viscosity measurements and frequencies of vibration, determining the value of one or more parameters of a model for the fluid.

According to a further aspect of the invention, there is provided a non-transitory computer-readable medium having stored thereon instructions for causing a processor of an apparatus for analysing a fluid to carry out a method comprising: obtaining a plurality of viscosity measurements made using at least one vibratory transducer at plural frequencies of vibration; and, based on the viscosity measurements and frequencies of vibration, determining the value of one or more parameters of a model for the fluid.

In a preferred arrangement, the model is a rheological model of viscosity for the fluid.

In a preferred arrangement, the aspects of the invention comprise approximating a shear rate quantity in a model with a frequency of vibration of the transducer at which a viscosity measurement is made. The shear rate is not estimated from estimating the speed or amplitude of displacement of the fluid-contacting surface of the transducer. Instead it is simply set equal to the angular frequency. This approximation is an application of the Cox-Merz rule, which is an empirically determined relationship for oscillatory flows in which the steady-state shear viscosity at a given shear rate is approximated to the dynamic viscosity at the same angular frequency of oscillation. Therefore, using a vibratory transducer, the shear rate can be approximated from the transducer's frequency of vibration in radians per second. Thus compared to other methods of determining a shear rate, the approximation of the shear rate by the angular frequency of vibration in a vibratory transducer is simple and allows the transducer to be used in many different environments with different flow conditions, without having to account for the different environments with different flow conditions in the estimate of shear rate. In addition, by substituting one quantity with another in rheological models, it does not significantly increase the complexity of the mathematical expressions and thus allows fluid-dependent parameters to be obtained from the mathematical expressions and the measured quantities with limited processing means; in some cases a closed-form expression for the desired numerical parameters can be obtained, which may simply be evaluated using the measured viscosities and frequencies.

Preferably, one or more fluid-dependent parameters are estimated by approximating a shear stress quantity in the model by the product of a viscosity and a frequency of vibration. The shear stress in the fluid at a given frequency of vibration is thus approximated by the product of the measured viscosity, i.e. the apparent viscosity of the fluid at that frequency of vibration, and the shear rate, wherein the shear rate is itself approximated by the angular frequency. This estimate of the shear stress may also be used with a rheological model to determine the fluid-dependent parameters for the rheological model, wherein a shear stress may be obtained for each frequency of vibration. Alternatively, the shear stress quantity can be removed from the rheological model itself by replacing it with the product of the angular frequency and the apparent viscosity, both values being obtained from a measurement. In this way, simplified equations for the fluid-dependent parameters may be obtained.

Alternatively or additionally, the plurality of viscosity measurements are obtained by determining Q factors based on resonance bandwidths at the respective frequencies of vibration. The Q factor may be being indicative of the degree of damping and therefore the viscosity value at that resonant frequency. This is particularly advantageous when combined with the use of approximation of shear rate by angular frequency of resonance because the Q factor itself can be determined based on the resonant bandwidth, i.e. the FWHM value, and thus both shear stress and shear rate quantities in the rheological model may be estimated by frequencies, in the form of frequency values and frequencies differences (bandwidths).

Alternatively, the aspects of the invention comprise determining the shear rate based on the amplitude of vibration of a vibrating element of the vibratory transducer.

In a preferred arrangement, the aspects of invention comprise determining the yield stress of a fluid. Methods and apparatus according to aspects of the invention may be methods for determining or estimating a yield stress of a fluid. The yield stress may have a significant effect on the behaviour of the fluid. It determines the amount of stress that the fluid must experience in order to flow, below which the fluid does not flow. In some fluids there may be no yield stress. In others, such as mayonnaise, the fluid's ability to not flow but instead retain its shape when under little or no stress (i.e. when below the yield stress) may be more noticeable. A particular yield stress value may be desired for a fluid. For example, a non-drip paint may be required to have a particular yield stress in order to allow a desired thickness of paint to resist the force of gravity. In other examples, it may be desired that the fluid has no yield stress. For example, it may be desired that a fluid may empty completely from a container without leaving an unwanted residue even when upended. Therefore it is advantageous to be able to determine the yield stress of a fluid.

Alternatively or additionally, the aspects of the invention comprise determining the value of the consistency K of a fluid. Methods and apparatus according to aspects of the invention may be methods for determining or estimating a consistency of a fluid. The consistency is a numerical parameter used in certain rheological models. It may be thought of as the viscosity when the value of the shear rate is precisely equal to 1/s. The value of the consistency is commonly used with the power law index n to estimate the shear stress at any shear rate.

Alternatively or additionally, the aspects of the invention comprise determining the value of the power law index n of a fluid, which is a numerical parameter used in certain rheological models. Methods and apparatus according to aspects of the invention may be methods for determining or estimating a power law index of a fluid. The value of n determines how closely the fluid adheres to Newtonian behaviour. If n is equal to 1, the viscosity is not a function of shear rate and the fluid is a Newtonian fluid. If n is less than 1, the apparent viscosity decreases as the shear rate increases. Such fluids are known as shear-thinning fluids. If n is greater than 1, the apparent viscosity increases with increasing shear rate. Such fluids are known as shear-thickening fluids. The value of the power law index n is commonly used with a consistency K to estimate the shear stress at any shear rate.

Alternatively or additionally, the aspects of the invention comprise determining the value of the plastic viscosity, which is a numerical parameter used in certain rheological models. In particular, it may be considered to be the slope of the shear-stress/shear-rate curve above the yield point.

Alternatively or additionally, the aspects of the invention comprise obtaining one or more temperature measurements of the fluid made by a temperature sensor. Preferably the aspects of the invention comprise making one or more temperature measurements of the fluid using a temperature sensor. Many fluid properties, including viscosity, vary with temperature, and so it is advantageous to know the temperature at which a viscosity reading was made in order to compare between measurements. Preferably at least one of the one or more transducers includes a temperature sensor. More preferably, the or each transducer includes a temperature sensor. By collocating the temperature sensors with one or more of the transducers, there is less risk of spatial variation in temperature between the portion of fluid from which the temperature is measured and the portion of fluid from which the viscosity is measured.

Certain rheological models of particular relevance to the techniques of this disclosure include the Bingham Model, the Casson Model, and the Herschel-Bulkley model, although the techniques of the present disclosure are not limited to these particular rheological models or any other particular model to which reference is made in this disclosure. The variation in viscosity $\eta$ with shear rate of a non-Newtonian fluid can be modelled by the Power Law equation, which is a two-parameter model of the apparent viscosity as a function of the shear rate:

$$\eta(\dot{\gamma}) = K'\dot{\gamma}^{n-1}$$

where n and K' are fluid-dependent parameters.

As discussed above, the value of n and particularly the degree to which it differs from 1 indicates the rate at which the apparent viscosity $\eta(\dot{\gamma})$ increases or decreases with increasing shear rate. Thus values of n other than unity quantify the type and extent of non-Newtonian behaviour of the fluid. The parameter K' is also a 'consistency', in this equation is given the prime symbol, i.e. "'", to indicate that it is not necessarily the same value as K included in a different model.

According to the Bingham model:

$$\sigma = \sigma_0 + \eta_p \dot{\gamma}$$

where $\sigma$ represents the shear stress and $\dot{\gamma}$ represents the shear rate. The model has two parameters: $\sigma_0$ represents the yield stress and $\eta_p$ represents the plastic viscosity, which is the slope of the shear-stress/shear-rate curve above the yield point.

According to the Casson Model:

$$\sigma^{1/2} = \sigma_0^{1/2} + (\eta_p \dot{\gamma})^{1/2}$$

which is also a two-parameter model of yield stress and plastic viscosity that introduces further degree of non-linearity in the relationship in the form of shear thinning. It is commonly used with inks and molten chocolate.

According to the Herschel-Bulkley model:

$$\sigma = \sigma_0 + K\dot{\gamma}^n$$

where K is a fluid dependent parameter termed the 'consistency', and n is a fluid dependent parameter termed the 'power law index' and $\sigma_0$ represents the yield stress. The Herschel-Bulkley model is a three-parameter model and can account for variations in shear stress with shear rate in yield stress fluids that are shear thinning or shear thickening.

Conventionally, the shear stress $\sigma$ is equal to the product of the apparent viscosity $\eta$ and the shear rate $\dot{\gamma}$. Substituting for $\sigma$ in the Herschel-Bulkley model and rearranging for shear stress provides the expression:

$$\sigma_0 = \eta\dot{\gamma} - K\dot{\gamma}^n.$$

Aspects of the invention may comprise obtaining multiple viscosity $\eta$ measurements made at different shear rate $\dot{\gamma}$, and so the fluid-dependent parameters $\sigma_0$, K, and n can be estimated for the model using, for example, regression techniques.

If the shear rate is to be approximated by the angular frequency of the viscosity-measuring vibratory transducer, the following equation may obtained:

$$\sigma_0 = \eta\omega - K\omega^n.$$

Therefore the shear stress, given by the product of the apparent viscosity and the shear rate, is also approximated as the product of the apparent viscosity and the angular frequency.

For some fluids, the value of the power law index n is already known. In such cases there are left the two unknowns of $\sigma_0$ and K. By obtaining two viscosity and frequency readings from either two viscosity transducers or a single multimode device, two simultaneous equations can be established:

$$\sigma_0 = \eta_1\omega_1 - K\omega_1^n$$

$$\sigma_0 = \eta_2\omega_2 - K\omega_2^n.$$

The solution of these two equations with two unknowns gives the yield stress $\sigma_0$ and consistency K. Rearranging the two equations, the yield stress and consistency can be estimated by evaluating the following expressions $$K = \frac{\eta_1\omega_1 - \eta_2\omega_2}{\omega_1^n - \omega_2^n}$$

$$\sigma_0 = \eta_1\omega_1 - K\omega_1^n = \eta_1\omega_1 - \frac{\eta_1\omega_1 - \eta_2\omega_2}{\omega_1^n - \omega_2^n}\omega_1^n.$$

To reduce sensitivity to measurement error, it is may be advantageous to have as wide a separation as possible between the frequencies at which the viscosity measurements are made. Preferably, the ratio of frequencies is at least 2:1, more preferably at least 3:1, more preferably still at least 4:1 and yet more preferably still at least 5:1. An upper preferred separation might correspond to an ordinary (i.e. non-angular) frequency of 500 Hz or greater and a lower separation might be below 300 Hz. In addition to as wide a separation as possible, lower frequencies are preferred as they are associated with shear waves penetrating more deeply into the fluid. In some embodiments, an upper ordinary frequency of around 1500 Hz and a lower ordinary frequency of around 400 Hz are used. However, the skilled reader will recognize that suitable frequencies are not limited to these examples and any suitable set of frequencies may be employed.

In other cases, the power law index, n, of a fluid is not already known. It can be derived by adding a further pair of viscosity and angular frequency readings, $\eta_3$, $\omega_3$, from a third viscosity transducer or by using a single device capable of measuring multiple frequencies or some combination thereof, wherein $\omega_3$ is different to $\omega_1$ and $\omega_2$. The result is a further simultaneous equation:

$$\sigma_0 = \eta_3\omega_3 - K\omega_3^n.$$

Substituting $\eta_1$, $\eta_2$, $\eta_3$, $\omega_1$, $\omega_2$, and $\omega_3$ into these equations appropriate allows the solution for yield stress $\sigma_0$ and consistency K, and power law index n.

Preferably the middle frequency is at or about a mean of the other two frequencies. More preferably, the type of mean is the geometric mean. This would mean that the ratio of the lowest to middle frequency is the same as the ration of the middle to highest frequency. This may provide a more satisfactory separation for frequencies, whereas an arithmetic mean would result in a middle frequency overly close to the highest frequency, particularly if the highest and lowest frequencies are separated by many orders of magnitude.

The techniques of the present disclosure are not limited to determining the parameters of a fluid modelled by the Herschel-Bulkley model but can instead, using two or more measurements of viscosity at different angular frequencies, be used to determine parameters of other rheological models such as the Casson model. For example, substituting the shear stress in the Casson model for the product of the shear rate k and the apparent viscosity η (as would be experienced at that shear rate) and rearranging for yield stress provides the expression:

$$\sigma_0^{1/2} = (\eta \dot{\gamma})^{1/2} - (\eta_p \dot{\gamma})^{1/2}.$$

If, using either two vibratory transducers or a single multimode vibratory transducer, a first viscosity measurement $\eta_1$ is taken at a first angular frequency $\omega_1$ and a second viscosity measurement $\eta_2$ is taken at a second angular frequency $\omega_2$, and the shear rate is in each case approximated by the angular frequency to which its viscosity measurement relates according to the empirical Cox-Merz rule, two equations are provided, which may be solved to estimate the yield stress $\sigma_0$ and plastic viscosity $\eta_p$:

$$\sigma_0^{1/2} = (\eta_1 \omega_1)^{1/2} - (\eta_p \omega_1)^{1/2}$$

$$\sigma_0^{1/2} = (\eta_2 \omega_2)^{1/2} - (\eta_p \omega_2)^{1/2}.$$

Depending on the model, it may not be feasible or convenient to provide an algebraic or closed-form expression for a property of interest such as the yield stress $\sigma_0$ in terms of measured values but the skilled reader will recognize that many such expressions can be solved efficiently and robustly with numerical methods.

The techniques of the present disclosure can be used to determine the variation in viscosity of a fluid with shear rate. For example, in the case of a power law fluid, the apparent viscosity $\eta(\dot{\gamma})$ is proportional to the shear rate raised to the power (1−n). By using a vibratory transducer, the shear rate can be approximated from the vibratory transducer's frequency of vibration according to the empirical Cox-Merz rule. By substitution of frequency for shear rate in the power law equation, the apparent viscosity can be expressed as:

$$\eta(\dot{\gamma}) = K' \omega^{n-1}.$$

Obtaining a first viscosity measurement $\eta_1$ at a first frequency $\omega_1$ and a second viscosity measurement $\eta_2$ at a second frequency $\omega_2$, using either two vibratory transducers or a single multimode vibratory transducer, results in the system of two simultaneous equations, can be solved to obtain, from the frequency and viscosity measurements, estimates of the power index, n, and consistency parameter K':

$$\eta_1 = K' \omega_1^{n-1}$$

$$\eta_2 = K' \omega_2^{n-1}.$$

In the techniques of this disclosure, the number of unknown parameters found by the solving of the equations may be equal to the number of (different) frequency and viscosity readings taken, i.e. the number of degrees of freedom. If more frequency and viscosity readings are available than unknowns in the system of equations to be solved, then an improved estimate of the parameter values can be obtained that is less sensitive to noise by way of regression techniques such as least-squares. By such techniques, 'best fit' estimates of the parameter values can be obtained. Alternatively or additionally, a sequence of measurements may be taken and averaging performed to reduce noise. For example, if it is desired to measure variation of fluid properties over time, and the fluid properties are estimated using multiple frequency-viscosity measurements at different times, e.g. at a desired or predetermined sampling rate, then a moving average can be applied to the measurements to reduce high-frequency noise. The skilled reader will recognize that is equivalent to applying a low-pass filter to the results.

The techniques of the present disclosure are not limited to the use of the Cox-Merz rule in approximating a shear rate with the angular frequency. It is known that the Cox-Merz rule is not applicable in all cases and deviations from the rule have been observed for some types of fluids. Nonetheless, the techniques of this disclosure may be used with approximation of shear rate by angular frequency in a rheological model even for such fluids. In such cases the estimated parameter value, such as a yield stress value, might not be accurate but may at least be repeatable estimated value for a given fluid and be indicative or revealing of the yield stress to a degree. This may be sufficient for many purposes, such as for the control of a process. Alternatively, the shear rate can be determined at which the viscosity measurement was made can be determined by some other approach.

In a preferred arrangement, at least some and preferably all of the vibratory transducers are resonant transducers, being configured to resonate at one or more frequencies by virtue of the particular stiffnesses and masses/moments of inertia of portions of the transducers. The advantage of resonance is that it allows more accurate measurements of viscosity through consideration of the 'Q factor', i.e. the sharpness of the resonant peak, rather than looking simply at the change in amplitude of vibration, which may become increasingly less accurate as the viscosity increases. As such the method eliminates the need for traditional measurement of shear stress which carries greater implementation difficulties and it is therefore ideally suited to the in-line setting or any environment where there is any fluidic disturbance.

In a preferred arrangement, one or more or the or each vibratory transducer is configured to vibrate at more than one frequency or in more than one mode. Advantageously, this allows the fluid properties to be estimated at a single location, which may provide a more accurate estimate of the fluid properties. This is because the measured viscosity value will vary according to environmental conditions. For example, viscosity is a property fluid that is sensitive to the temperature of the fluid. Spatial variation of temperature in the fluid between the locations of viscosity-measuring transducers may negatively impact the accuracy of the viscosity measurement and thus the estimate of any fluid properties derived from such measurements. To measure the fluid viscosity at a single location reduces the risk of spatial variation of environmental conditions such as temperature negatively impacting the accuracy of the estimate of the fluid-dependent parameters for the viscosity model.

Alternatively or additionally, at least one of the one or more transducers is configured to measure the viscosity of the fluid at one frequency of vibration. Preferably, each of a plurality of transducers measure the viscosity of the fluid at respective different single frequencies of vibration. Such an arrangement may be desirable in some instances, such as in the conversion of a process line in which at least one viscosity-measuring transducer is already in place, operating at a single frequency of vibration.

In a preferred arrangement, one or more or the or each vibratory transducer is configured to vibrate in a torsional mode. Advantageously, the operation of a vibratory transducer in a torsional mode promotes the generation of shear waves which favour the high integrity measurement of viscosity.

Alternatively or additionally, one or more or the or each vibratory transducer are arranged to vibrate in lateral mode and/or in a longitudinal mode. This may be in addition to vibrating in a torsional mode or as an alternative.

In a preferred arrangement, one or more or the or each vibratory transducer comprises an insertion element for at least partial immersion in a fluid to be analysed, the insertion element being configured to undergo vibration and measure the viscosity of fluid around it.

Alternatively or additionally, one or more or the or each vibratory transducer comprises a vibrating tube or vessel configured to receive the fluid under analysis within the tube or vessel.

Alternatively or additionally, at least a portion, and preferably all or substantially all, of the fluid-contacting elements of the transducer comprise one or more metal materials. The or a metal material may optionally be provided only on the surface of the fluid-contacting elements or such elements may be made mainly or entirely from a metal material. A particularly preferred type of metal is a stainless steel and particularly a stainless steel having good corrosion resistance such as grade 316 stainless steel. Advantageously, the transducer can be made resistant to corrosion and meet hygiene requirements of food process lines, and also be robust enough to resist damage by forces generated by the flow and impact by any rigid solid components entrained in a flow.

Alternatively or additionally, the fluid-contacting elements of the transducer have a fluoropolymer coating, which may also have an advantageous corrosion resistant effect.

A sample of fluid may be analysed off-line. For example, a sample of fluid from a process line may be extracted and a method of analysis of the fluid embodying an aspect of the invention subsequently applied. This technique may have advantages in laboratory environments. For example, one or more hand-held transducers may be applied to the fluid in a container. By comparison with traditional laboratory techniques, such as the shear vane experiment, it can be easier and quicker to set up a test as the precise placement of the transducer in the fluid is not so critical—it only needs to be partially or fully immersed in the fluid. By contrast, it can be time consuming to set up a shear vane experiment due to the necessary setting up and maintaining of gaps and spatial separation of the sensing parts.

Alternatively or additionally, the aspects of the invention comprise measuring the viscosity of the fluid while the fluid is flowing past the transducer or in motion around the transducer.

More preferably, the aspects of the invention comprise analysing the fluid on-line in a fluid process. Examples include a food or drink production process, a pharmaceutical production process, a refinery process and a polymer process. Even more preferably, the values of the fluid-dependent parameters of the fluid calculated or estimated from the viscosity measurements at different frequencies, such as a yield stress of the fluid, a power law index of the fluid, a consistency of the fluid and/or a plastic viscosity of the fluid, can be used to control a process. In an exemplary embodiment, it is desired to produce a fluid having a desired rheological behaviour, i.e. a desired variation of viscosity with shear rate or shear stress. When modelled with a rheological model of viscosity, one or more of the fluid-dependent parameters of the model have desired values. The process line is monitored using methods and apparatus embodying aspects of the invention and one or more fluid-dependent parameters of the model are estimated for the fluid. Based at least in part on the degree to which the estimated one or more parameters of the fluid differs from a desired or target value, more or less of a parameter-affecting additive is introduced into the fluid and/or the fluid is affected by a parameter-affecting process to a greater or lesser degree.

Aspects of the invention may comprise the measuring of viscosities in aggressive environments. The temperature of the fluid may be greater than 100° C., greater than 200° C., greater than 300° C., or greater than 400° C., and viscosities may still be measured by the vibratory transducer. The fluid may be pressurized to high or low pressures. The absolute pressure of the fluid may be less than 1 bar or 1 atmosphere, less than 0.5 bar, less than 0.1 bar, or less than 0.01 bar. The absolute pressure of the fluid may be greater 1 bar or 1 atmosphere, greater than 5 bar, greater than 10 bar, or greater than 100 bar, and/or up 700 bar.

Aspects of the invention comprise a parameter-estimating means. The parameter estimating means may comprise an electronic parameter estimator, which comprise a computer having stored thereon software for performing the determining of the value of one or more parameters of a model according to techniques of this disclosure.

Alternatively or additionally, the electronic parameter estimator may comprise an analogue, digital, or mixed signal circuit or an application specific integrated circuit (ASIC) or a field-programmable gate array (FPGA) or combinations thereof configured to perform or assist the determining of the value of one or more parameters of a model according to techniques of this disclosure.

According to a further aspect of the invention, there is provided a method for analysing a fluid comprises using at least one vibratory transducer to measure the viscosity of the fluid at plural frequencies of vibration, and using the measured values of viscosity at the different frequencies to determine the value of one or more other parameters of the fluid.

According to a further aspect of the invention, there is provided an apparatus comprising at least one vibratory transducer configured to measure a fluid viscosity at plural frequencies of vibration for providing viscosity measurements and frequencies of vibration for determining the value of one or more parameters of the fluid.

Features described in one aspect of the invention may be applied to other aspects of the invention in any appropriate combination. For example, a feature described in relation to a method embodying an aspect of the invention may be incorporated into an apparatus embodying an aspect of the invention as an apparatus feature, either as a means having the appropriate functionality or as specific element as described herein. Similarly, a feature described in relation to an apparatus embodying an aspect of the invention may be incorporated into a method embodying an aspect of the invention as a method step or other limitation.

It should be appreciated that particular combinations of the various features described and defined in any aspects of the invention can be implemented and/or supplied independently.

Other aspects and features of the invention will become apparent to the skilled reader upon review of the following description of specific examples in conjunction with the accompanying drawings.

BRIEF DESCRIPTION OF THE DRAWINGS

Aspects of the invention will be described in more detail by way of example only with reference to the accompanying drawings. The components within the drawings are not necessarily to scale, emphasis instead being placed upon clearly illustrating principles.

DETAILED DESCRIPTION OF SOME EMBODIMENTS

Figure 1:
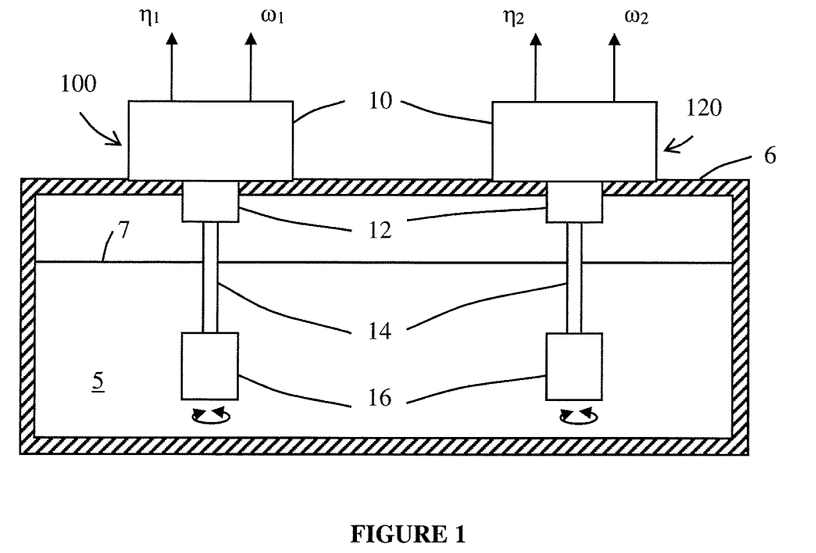
FIG. 1 shows schematically a first apparatus embodying an aspect of the invention, the apparatus comprising a pair of vibratory transducers for measuring viscosity in a fluid sample.

FIG. 1 illustrates schematically an example apparatus for analysing a fluid using one or more techniques of this disclosure. The apparatus comprises a first resonant viscosity transducer 100 and a second resonant viscosity transducer 120 located in relatively close proximity to the first resonant viscosity transducer in a fluid sample 5. The fluid sample 5 in this instance is a fixed volume of generally stationary fluid in a chamber 6, the fluid having a free surface 7, and portions of the viscosity transducers piercing the free surface 7 from above.

While the chamber 6 is drawn in FIG. 1 having a closed top wall, as may be necessary if its contents are pressurized, the chamber may equally be open from above. The fluid sample may therefore be at atmospheric pressure. In such a configuration, the viscosity transducers may be located above the chamber 7 such that at least portions of the transducers extend into the upper opening of the chamber 7 and contact the fluid sample 5 instead.

The resonant viscosity transducers are of a type described in U.S. Pat. No. 6,450,013, in which the transducers include a vibrating element configured to oscillate in a torsional mode. The vibrating element is immersed in the fluid and the viscosity is determined by correlation with the damping experienced by the element, i.e. the Q factor. In particular, each transducer comprises a sensor mounting 10, a semi-rigid connection member 12, a shaft 14 and a sense element 16. The shaft 14 and the sense element 16 are driven to vibrate torsionally with an angular frequency co. The sense element 16 is of relatively large mass and the shaft 14 and sense element 16 are formed, at least substantially and possibly entirely, of a metal material such as a stainless steel. The sense element 16 and shaft 14 both have a circular cross-section, i.e. they are circularly symmetrical about the axis of oscillatory rotation. An example transducer that may be suitable for determining the viscosity via vibration at a frequency is the XL7 model viscometer manufactured by Hydramotion Ltd of Malton, UK.

The contents of the chamber 6 are pressurized to 10 Bar relative to atmospheric pressure. The sensing element is exposed to the viscous effect of the fluid in the sample 5. Increasing viscosity of the fluid causes an increased damping of the vibration in the sensor, resulting in a measurable reduced vibrational efficiency of the system.

In this apparatus, the first viscosity transducer 100 is specially designed, via choice of stiffness and mass or moment of inertia of the resonant system, to have a low resonant frequency at 300 Hz, i.e. an angular frequency of approximately 1885 rad/s. The second viscosity transducer 120 is specially designed to have a higher resonant frequency at 1500 Hz, i.e. an angular frequency of approximately 9425 rad/s.

To determine the viscosity at the resonant frequencies of the first and second viscosity transducers, the 'Q factor' of the vibration can be determined. The Q factor is a dimensionless parameter that indicates the level of damping of a resonator, wherein the level of damping is a function of the viscosity. In particular, it indicates the degree to which a resonator is underdamped. On a plot of frequency response, a high Q factor provides a high and narrow peak at the resonant frequency whereas a low Q factor provides a low and wide peak. Due to the change in width of the peak with damping, the Q factor can be defined as the ratio of the resonant frequency to the resonant bandwidth:

$$Q = \frac{\omega_R}{\Delta\omega}$$

wherein $\omega_R$ is the resonant frequency in radians per second and $\Delta\omega$ is the Full Width at Half Maximum (FWHM), the bandwidth over which the power of the vibration is greater than half of the maximum (or equivalently the amplitude of vibration is greater than the maximum amplitude at resonance divided by $\sqrt{2}$), i.e. the bandwidth between the 3 dB points. The fluid viscosity is inversely proportional to the square of the Q factor and any constant of proportionality needed to compute the value of the viscosity measurement can be obtained by calibration with reference fluids of known viscosity. It should be noted that the measurement of viscosity at or corresponding to a frequency of vibration may comprise making amplitude measurements at more than one frequency, such as at the two FWHM points in order to obtain $\Delta\omega$, but a single viscosity measurement is obtained.

The first and second viscosity transducers 100, 120 both provide viscosity measurements corresponding to their resonant frequencies. The first and second viscosity measurements $\eta_1$, $\eta_2$, and first and second angular frequencies $\omega_1$, $\omega_2$ are provided to a processing module (not shown) which processes these measurements to provide estimates of one or more fluid properties.

Figure 2:
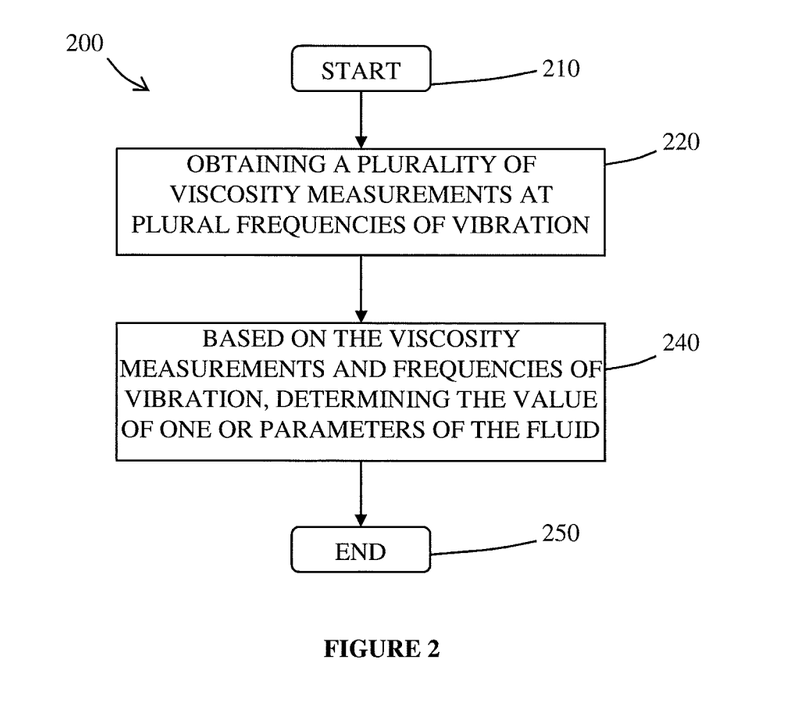
FIG. 2 is a flowchart of a process embodying an aspect of the invention.

FIG. 2 is a flowchart illustrating an example process for analysing a fluid using one or more techniques of this disclosure. While the process can be performed by a variety of devices in accordance with the aspects of this disclosure, for purposes of explanation, the process is described with respect to the devices of FIG. 1.

The process begins at start block 510 and transitions to block 510 where the first and second viscosity transducers 100, 120 each provide viscosity measurements $\eta_1$, $\eta_2$, corresponding to their resonant angular frequencies $\omega_1$, $\omega_2$. These are obtained at the processing module.

At the following block 520, the processing module evaluates the yield stress $\sigma_0$ and consistency parameter K from the measured $\eta_1$, $\eta_2$, $\omega_1$, and $\omega_2$ by substitution into the following equations derived from the Herschel-Bulkley model:

$$\sigma_0 = \eta_1\omega_1 - K\omega_1^n$$

$$\sigma_0 = \eta_2\omega_2 - K\omega_2^n.$$

For operation in a fluid for which the power law index n is known, the processing module evaluates K and $\sigma_0$ according to the following expressions derived from the simultaneous equations in $\eta$ and $\omega$ above:

$$K = \frac{\eta_1\omega_1 - \eta_2\omega_2}{\omega_1^n - \omega_2^n}$$

$$\sigma_0 = \eta_1\omega_1 - K\omega_1^n = \eta_1\omega_1 - \frac{\eta_1\omega_1 - \eta_2\omega_2}{\omega_1^n - \omega_2^n}\omega_1^n.$$

To determine values for K and $\sigma_0$, the processing module may comprise a computer comprising a processor and a memory, the memory storing software that, when run by the processor, evaluates these expressions continuously and updates its estimates of K and $\sigma_0$ based on the latest values of $\eta_1$, $\eta_2$, $\omega_1$, and $\omega_2$ received from the viscosity transducers 100, 120. As an alternative to a processor and memory, the processing module may include a field programmable gate array (FPGA) device configured to perform the operations of evaluating these expressions.

The estimated values of K and $\sigma_0$ are provided to an output device (not shown in FIG. 1), which may be a display device or a printing device. Alternatively or additionally, the estimated values of K and $\sigma_0$ may be provided to a further processing module for further calculations or for controlling a process. Alternatively or additionally, before being passed for processing or output elsewhere, the values may be low-pass filtered using, for example, a low-pass finite impulse response (FIR) filter, in which each output value is a weighted sum of a certain number of recent input values.

Figure 3:
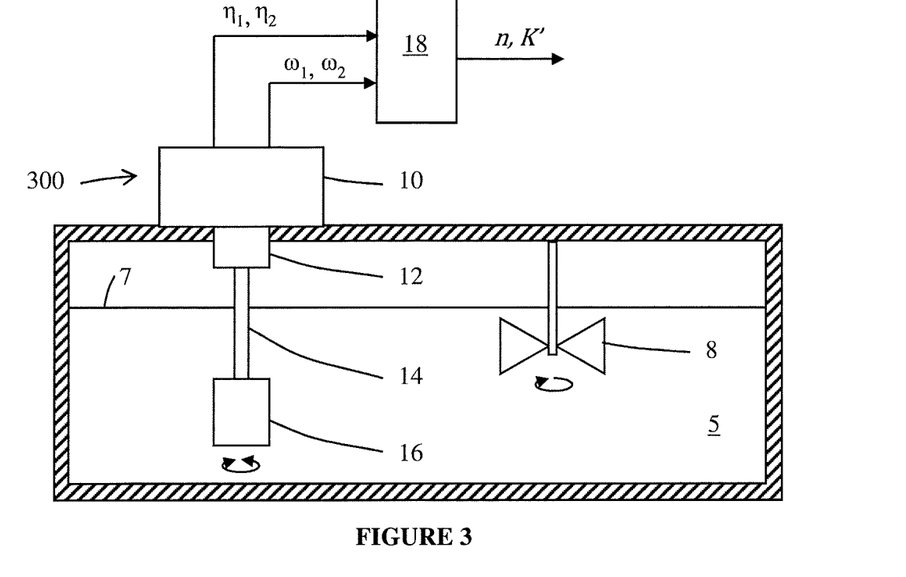
FIG. 3 shows schematically a second apparatus embodying an aspect of the invention, the apparatus comprising a single vibratory transducer for measuring viscosity configured to operate at two different frequencies.

FIG. 3 illustrates schematically a further example apparatus for analysing a fluid using one or more techniques of this disclosure. The apparatus comprises a single resonant viscosity transducer 300 that has been specially designed to be able to operate at two different frequencies, 300 Hz and 1500 Hz, i.e. angular frequencies of approximately 1885 rad/s and 9425 rad/s, as with the apparatus shown in FIG. 1. Such a transducer may be obtained by choice of stiffness and mass or moment of inertia for each of the elements of the transducer such that it has at least two resonant modes corresponding to the desired frequencies. The fluid sample 5 in this instance is a fixed volume of fluid in a chamber 6, the fluid having a free surface 7, and a portion of the viscosity transducer 300 piercing the free surface 7 from above. In contrast with the example shown in FIG. 1, the chamber 6 is provided with a paddle stirrer 8 which continuously agitates the fluid sample 5 such that the fluid is flowing past the immersed portion of the viscosity transducer 300.

The first and second viscosity measurements $\eta_1$, $\eta_2$, and first and second frequencies $\omega_1$, $\omega_2$ are provided to a processing module 18 which processes these measurements to provide estimates of one or more fluid properties.

To provide estimates of parameters for the power law model, the processing module 18 evaluates the power law index n and consistency parameter K' from the measured $\eta_1$, $\eta_2$, $\omega_1$, and $\omega_2$ by substitution into the following equations model $$\eta_1 = K'\omega_1^{n-1}$$

$$\eta_2 = K'\omega_2^{n-1}.$$

The processing module evaluates n and K' according to the following expressions derived from the simultaneous equations in $\eta$ and $\omega$ above:

$$n = 1 + \frac{\log(\eta_1) - \log(\eta_2)}{\log(\omega_1) - \log(\omega_2)}$$

$$K' = \eta_1\omega^{\left(\frac{\log(\eta_2)-\log(\eta_1)}{\log(\omega_1)-\log(\omega_2)}\right)}.$$

Figure 4:
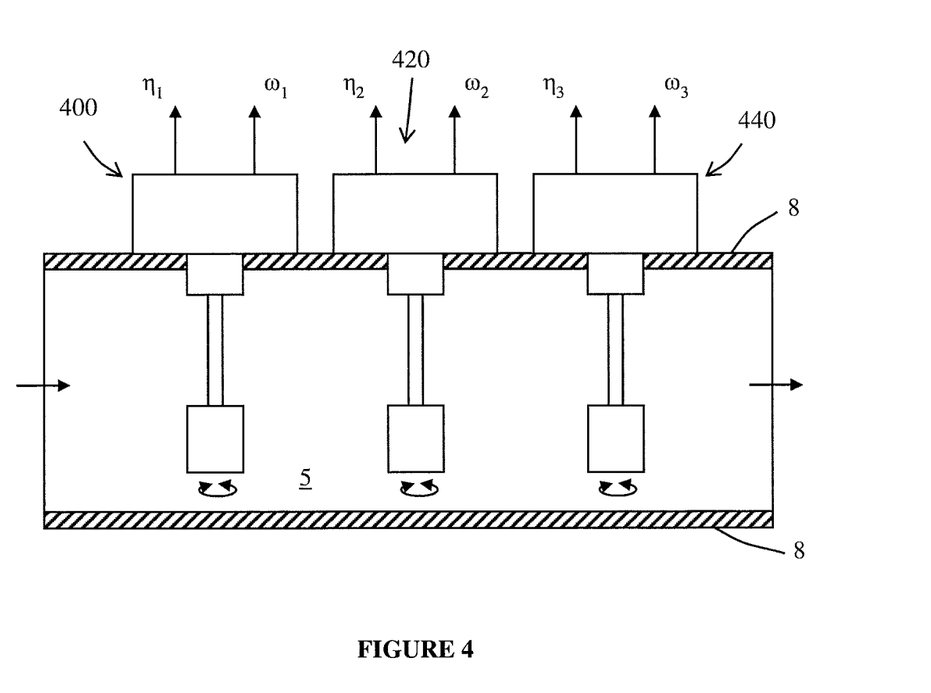
FIG. 4 shows schematically a third apparatus embodying an aspect of the invention, the apparatus comprising three vibratory transducers for measuring viscosity, the transducers being configured to vibrate at different frequencies.

FIG. 4 illustrates schematically a further example apparatus for analysing a fluid using one or more techniques of this disclosure, in which multiple resonant viscosity transducers 400, 420, 440 each vibrate at increasingly higher frequencies corresponding to their respective resonant frequencies. It will be appreciated that the ordering of the transducers in increasing resonant frequency is not essential and they may be in any arbitrary order. In this instance, the resonant frequencies are 300 Hz, 700 Hz and 1500 Hz, i.e. angular frequencies of approximately 1885 rad/s, 4398 rad/s and 9425 rad/s. The fluid sample 5 in this instance is a flowing in a conduit 7 at an upstream average speed of 1 m/s. The viscosity transducers 400, 420, 440 extend from above through the wall of the conduit 7, the portions extending through the wall of the conduit 7 being in contact with the fluid sample as it flows past the viscosity transducers 400, 420, 440.

The first, second and third viscosity measurements $\eta_1$, $\eta_2$, $\eta_3$ and first and second frequencies $\omega_1$, $\omega_2$, $\omega_3$ are provided to a processing module (not shown) which processes these measurements to provide estimates of one or more fluid properties.

The processing module evaluates the yield stress $\sigma_0$ and consistency parameter K and power law index n from the measured $\eta_1$, $\eta_2$, $\eta_3$, $\omega_1$, $\omega_2$, and $\omega_3$ by substitution into the following equations derived from the Herschel-Bulkley model:

$$\sigma_0 = \eta_1\omega_1 - K\omega_1^n$$

$$\sigma_0 = \eta_2\omega_2 - K\omega_2^n$$

$$\sigma_0 = \eta_3\omega_3 - K\omega_3^n.$$

The processing module finds values of the yield stress $\sigma_0$ and consistency parameter K and power law index n that best fit the measured viscosities and frequencies via numerical optimization methods such as those found in MATLAB™ of The MathWorks, Inc.; see, for example, the MATLAB Optimization Toolbox.

Figure 5:
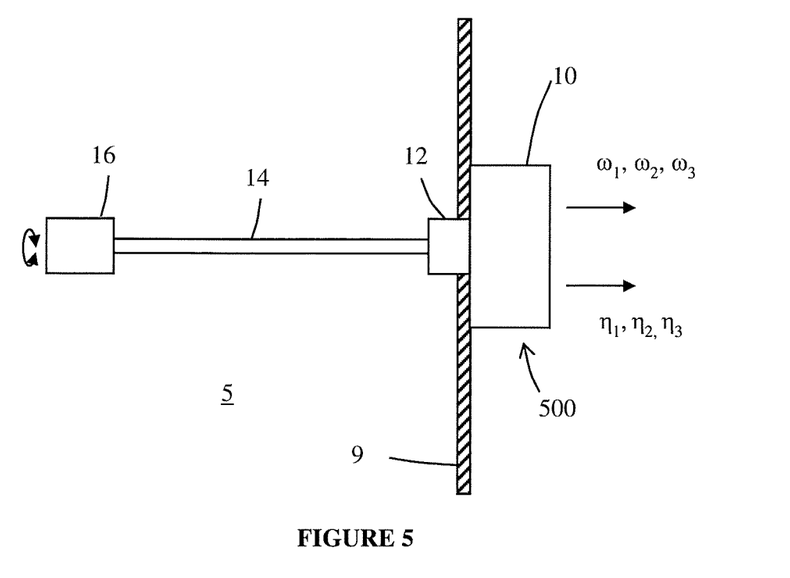
FIG. 5 shows schematically a fourth apparatus embodying an aspect of the invention, the apparatus comprising a single vibratory transducer for measuring viscosity, the transducer being configured to vibrate at three different frequencies.

FIG. 5 illustrates schematically a further example apparatus for analysing a fluid using one or more techniques of this disclosure. The apparatus includes a single resonant viscosity transducer 500 that has been specifically designed to be able to operate at multiple frequencies: 300 Hz, 700 Hz and 1500 Hz as per the embodiment shown in FIG. 4, i.e. angular frequencies of approximately 1885 rad/s, 4398 rad/s and 9425 rad/s. Such a transducer may be obtained by choice of stiffness and mass or moment of inertia for each of the elements of the transducer such that it has at least two resonant modes corresponding to the desired frequencies. The viscosity transducer 500 is mounted horizontally through the side wall 9 of a chamber and the portion extending through the side wall is immersed in the fluid sample 5. The viscosity transducer 500 has a particularly long shaft 14 such that the sense element 16 is spaced a particularly long distance from the walls 9 of the chamber.

The first, second and third viscosity measurements $\eta_1$, $\eta_2$, $\eta_3$ and first and second frequencies $\omega_1$, $\omega_2$, $\omega_3$ are provided to a processing module (not shown) which processes these measurements to provide estimates of one or more fluid properties.

As with the embodiment shown in FIG. 4, the processing module evaluates the yield stress $\sigma_0$ and consistency parameter K and power law index n from the measured $\eta_1$, $\eta_2$, $\eta_3$, $\omega_1$, $\omega_2$, and $\omega_3$ by substitution into the following equations derived from the Herschel-Bulkley model:

$$\sigma_0 = \eta_1 \omega_1 - K\omega_1^n$$

$$\sigma_0 = \eta_2 \omega_2 - K\omega_2^n$$

$$\sigma_0 = \eta_3 \omega_3 - K\omega_3^n.$$

The processing module finds values of the yield stress $\sigma_0$ and consistency parameter K and power law index n that best fit the measured viscosities and frequencies via numerical optimization methods such as those found in MATLAB™ of The MathWorks, Inc.; see, for example, the MATLAB Optimization Toolbox.

Figure 6:
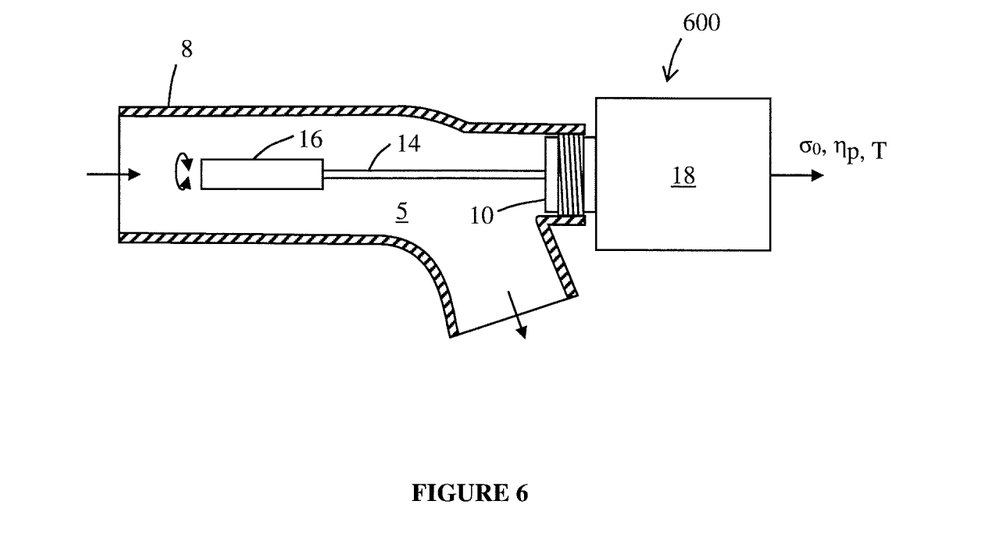
FIG. 6 shows schematically a fifth apparatus embodying an aspect of the invention, the apparatus comprising a single resonant vibratory transducers for measuring viscosity, the transducer being configured to vibrate at two different frequencies.

FIG. 6 illustrates a variant apparatus for analysing a fluid using one or more techniques of this disclosure, in which multiple resonant viscosity transducers 400, 420, 440 each vibrate at increasingly higher frequencies corresponding to their respective resonant frequencies. The apparatus includes a single resonant viscosity transducer 600 that has been specifically designed to be able to operate at two frequencies: 300 Hz and 1500 Hz as per the second embodiment shown in FIG. 3, i.e. angular frequencies of approximately 1885 rad/s and 9425 rad/s. Such a transducer may be obtained by choice of stiffness and mass or moment of inertia for each of the elements of the transducer such that it has at least two resonant modes corresponding to the desired frequencies.

The viscosity transducer 600 comprises a sense element 16 on a shaft 14 extending from a threaded sensor mount 10. A processing module 18 is shown on the other side of the threaded sensor mount 10. The threaded portion of the sensor mount 10 engages with corresponding threads of a conduit 8. The sense element 16 and shaft extend along the axis of the conduit 8 facing upstream. The fluid-contacting portions of the viscosity transducer are formed of stainless steel (type 316) to resist corrosion and avoid contamination of the fluid. The conduit 8 includes a corner such that the fluid is diverted by the conduit walls to one side after it has passed the sense element 16 of the transducer 600, i.e. the viscosity transducer 600 is installed in an elbow section of the conduit 8.

The processing module 18 outputs the plastic viscosity $\eta_p$, the yield stress $\sigma_0$, and the fluid temperature. The fluid temperature is obtained from a temperature sensor included in the sense element 16 of the viscosity transducer 600. The plastic viscosity $\eta_p$ and the yield stress $\sigma_0$ are obtained from the measured $\eta_1$, $\eta_2$, $\omega_1$, and $\omega_2$ by substitution into the following equations derived from the Casson model and solving the equations for the plastic viscosity $\eta_p$ and the yield stress $\sigma_0$:

$$\sigma_0^{1/2} = (\eta_1 \omega_1)^{1/2} - (\eta_p \omega_1)^{1/2}$$

$$\sigma_0^{1/2} = (\eta_2 \omega_2)^{1/2} - (\eta_p \omega_2)^{1/2}.$$

In the examples shown in FIGS. 1, and 3 to 6, the fluid is variously at rest, in motion in a chamber, stirred by a paddle, and flowing in a conduit. It will be recognized that all of the example apparatus may be used in any of such fluid environments. For example, while FIG. 4 illustrates fluid flowing in a conduit past three separate viscosity transducers, these could be replaced by the single multimode viscosity transducer in FIG. 5 or any of the viscosity transducer arrangements in FIGS. 1 and 3.

The variant apparatus of FIG. 6 could equally have been included in any of the configurations of FIGS. 1 and 3 to 5, where the pipe fitting may be replaced with a more suitable means of attachment for extending through a bulkhead or conduit wall.

The examples shown in FIGS. 1 and 3 to 6 employ insertion-type vibratory sensors, wherein the fluid under analysis surrounds the at least partially immersed vibrating element and all operate in torsional modes, but the techniques of the present disclosure are applicable to any vibratory sensors which measure viscosity through resonance in either lateral, longitudinal or torsional modes as either an insertion element immersed in the fluid to be analysed or as a resonating tube or vessel carrying the fluid. For example, the viscosity could be measured by a vibrating element included in a Coriolis flow meter or Coriolis flow and density meter.

The techniques of the present disclosure may perform robustly regardless of the flow rate of the fluid relative to the one or more viscosity transducers. Further, they may perform robustly over a wide range of process conditions without operator intervention. Similarly, the particular fluid model parameter values estimated by the processing module may vary from those of the particular examples disclosed in FIGS. 1, and 3 to 5. For example, the yield stress $\sigma_0$ and constituency parameter K may be estimated using a single multimode viscosity transducer as shown in the apparatus of FIG. 3, even though such apparatus is described as determining constituency parameter K' and Power Law index n.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In the context of this disclosure, the term "based on" does not mean "based only on," unless expressly specified otherwise. In other words, the term "based on" describes both "based only on" and "based at least on." The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The methods, process and algorithms that have been described may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. In the context of this disclosure, the term "code" may refer to software, instructions, code or data that is/are executable by a computing device or processor.

Software or instructions or data may also be transmitted over a transmission medium. For example, if the software is transmitted from a website, server, or other remote source using a coaxial cable, fibre optic cable, twisted pair, digital subscriber line (DSL), or wireless technologies such as infrared, radio, and microwave, then the coaxial cable, fibre optic cable, twisted pair, DSL, or wireless technologies such as infrared, radio, and microwave are included in the definition of transmission medium.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

The headings provided herein are for convenience only and do not necessarily affect the scope or meaning of the aspects of this the disclosure defined by the claims.

Some embodiments have been described. These embodiments are presented by way of example only and are not intended to limit the scope of the disclosure. Indeed, the novel methods, apparatus and systems described herein may be embodied in a variety of other forms. It should be apparent to those skilled in the art that many more modifications besides those already described are possible without departing from the inventive concepts herein.

While endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A method for analysing a non-Newtonian fluid, the method comprising:
   obtaining a plurality of viscosity measurements of a non-Newtonian fluid at plural frequencies of vibration, the viscosity measurements being made using at least one vibratory transducer; and,
   based on the obtained plurality of viscosity measurements and the plural frequencies of vibration, determining the value of one or more parameters of a model for the non-Newtonian fluid by approximating a shear rate quantity in the model by a frequency of vibration.

2. The method of claim 1, wherein the one or more parameters of the model are determined by approximating a shear stress quantity in the model by the product of a viscosity and a frequency of vibration.

3. The method of claim 1, wherein the or each of the at least one vibratory transducer is a resonant transducer and the plurality of viscosity measurements are obtained by determining Q factors based on resonance bandwidths at the respective frequencies of vibration.

4. The method of claim 1, wherein the one or more parameters for which values are determined comprise a yield stress of the fluid.

5. The method of claim 1, wherein the one or more parameters for which values are determined comprise one or more of:
   a consistency of the fluid, a power law index of the fluid, and a plastic viscosity of the fluid.

6. The method of claim 1, wherein the viscosity measurements are made while the fluid is in contact with and flowing around the at least one vibratory transducers.

7. An apparatus for analysing a non-Newtonian fluid, the apparatus comprising:
   one or more vibratory transducers for making a plurality of viscosity measurements of a non-Newtonian fluid, each of the plurality of viscosity measurements being made at a different frequency of vibration; and
   an electronic parameter estimator for, based on the plurality of viscosity measurements and the plural frequencies of vibration, determining the value of one or more parameters of a model for the non-Newtonian fluid by approximating a shear rate quantity in the model by a frequency of vibration.

8. The apparatus of claim 7, wherein the one or more parameters of the model are determined by approximating a shear stress quantity in the model by the product of a viscosity and a frequency of vibration.

9. The apparatus of claim 7, wherein the or each of the at least one vibratory transducer is a resonant transducer and the plurality of viscosity measurements are obtained by determining Q factors based on resonance bandwidths at the respective frequencies of vibration.

10. The apparatus of claim 7, wherein the one or more parameters for which values are determined comprise a yield stress of the fluid.

11. The apparatus of claim 7, wherein the one or more parameters for which values are determined comprise one or more of:
    a consistency of the fluid, a power law index of the fluid, and a plastic viscosity of the fluid.

12. The apparatus of claim 7, further comprising a temperature sensor for obtaining one or more temperature measurements of the fluid.

13. The apparatus of claim 7, wherein the model is a rheological model of viscosity for the fluid.

14. The apparatus of claim 13, wherein the model is one of the Casson model, the Bingham model, the power law model, and the Herschel-Bulkley model.

15. The apparatus of claim 7, wherein the or each of the at least one vibratory transducers is configured to vibrate at more than one frequency or in more than one mode.

16. The apparatus of claim 7, comprising a plurality of vibratory transducers each configured to vibrate at different frequencies, the viscosity measurements being made by the plurality of vibratory transducers.

17. The apparatus of claim 7, wherein the or each vibratory transducer is configured to vibrate in a torsional mode.

18. The apparatus of claim 7, wherein the viscosity measurements are made while the fluid is in contact with and flowing around the at least one vibratory transducers.

19. The apparatus of claim 18, wherein the viscosity measurements are made on-line in a fluid process.

20. A non-transitory computer-readable medium having stored thereon instructions for causing a processor of an apparatus to:
- obtain a plurality of viscosity measurements of a non-Newtonian fluid at plural frequencies of vibration, the viscosity measurements being made using at least one vibratory transducer; and,
- based on the obtained plurality of viscosity measurements and the plural frequencies of vibration, determine the value of one or more parameters of a model for the non-Newtonian fluid by approximating a shear rate quantity in the model by a frequency of vibration.

* * * * *